July 3, 1928.
C. H. LEINERT
1,675,566
VALVE FOR COMPRESSORS
Filed July 31, 1922      2 Sheets-Sheet 1
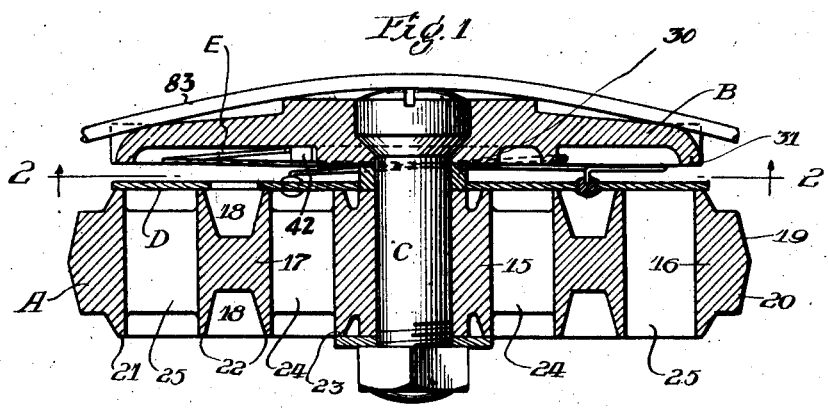
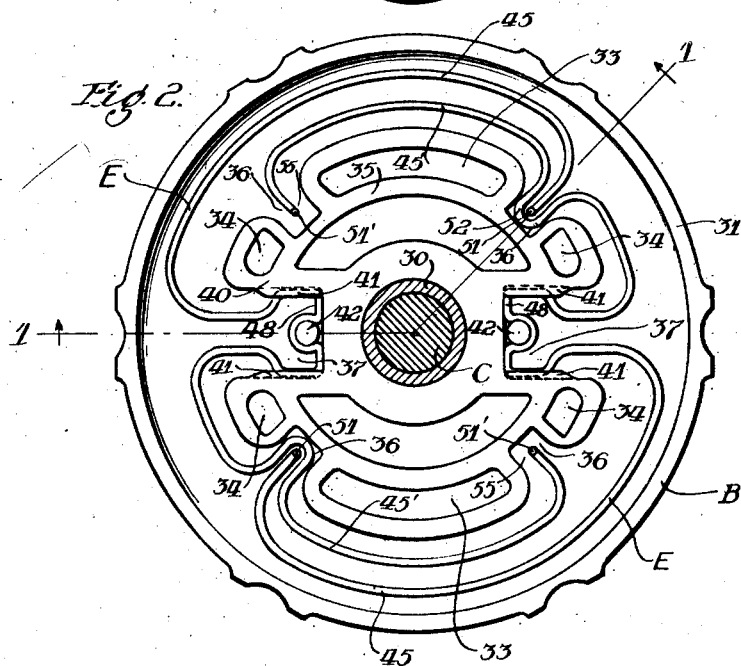
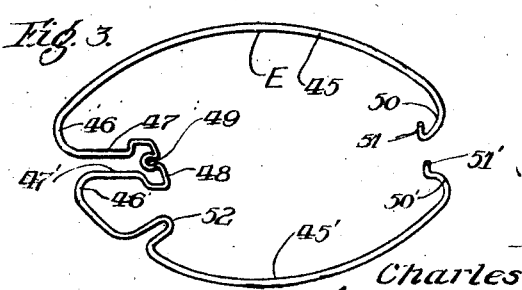
Inventor
Charles H. Leinert July 3, 1928.  
C. H. LEINERT  
VALVE FOR COMPRESSORS  
Filed July 31, 1922
1,675,566
2 Sheets-Sheet 2
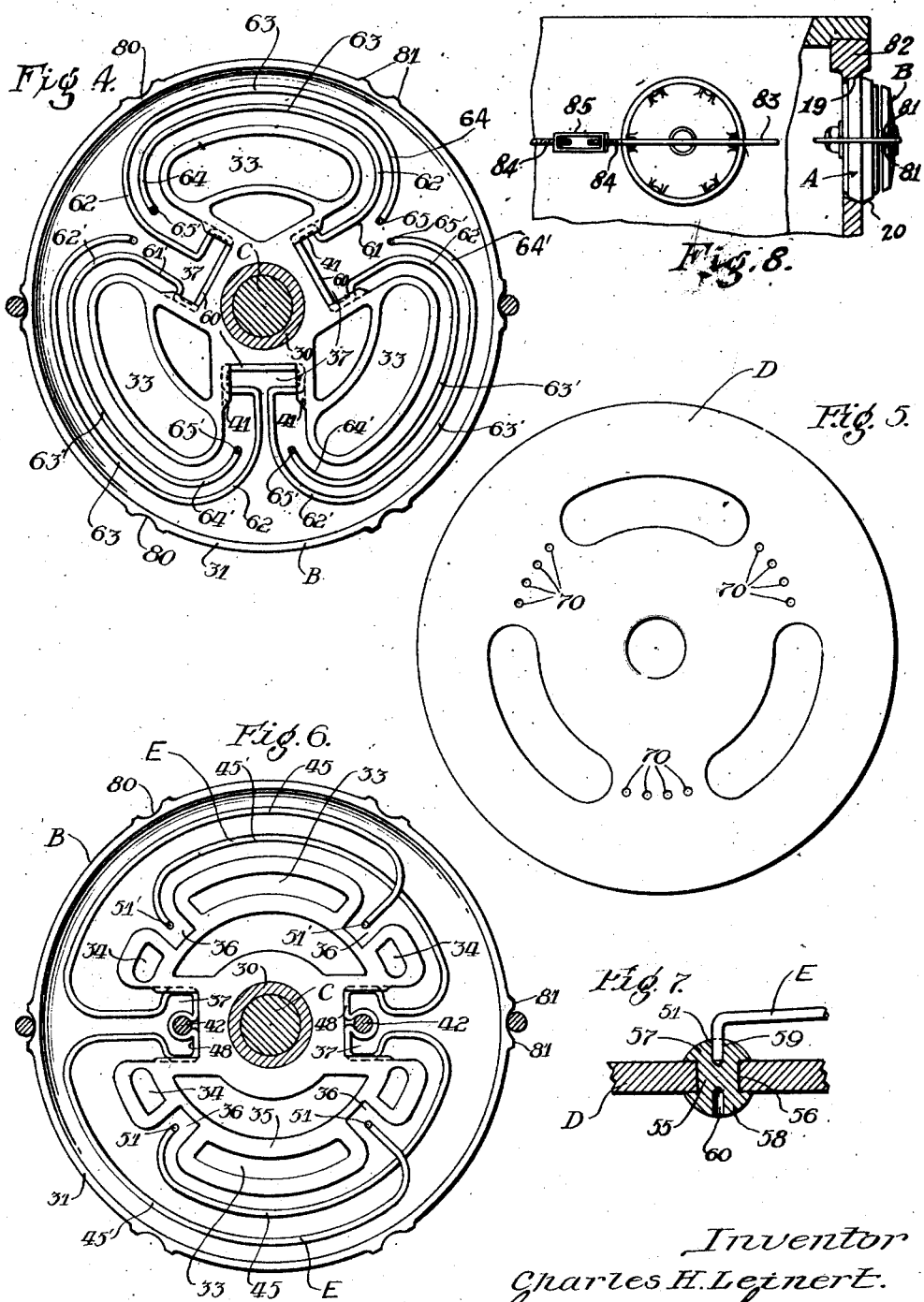

Patented July 3, 1928.

1,675,566

UNITED STATES PATENT OFFICE.

CHARLES H. LEINERT, OF CHICAGO, ILLINOIS, ASSIGNOR TO LEINERT VALVE COMPANY, OF CHICAGO, ILLINOIS, A CORPORATION OF ILLINOIS.

VALVE FOR COMPRESSORS.

Application filed July 31, 1922. Serial No. 578,610.

This invention relates to a valve, either suction or discharge, which is particularly adapted for use with compressors and blowing engines. It is of the general kind shown and described in my Patent No. 1,240,461, but differs therefrom in a number of respects which will hereinafter be pointed out.

In the present invention I have aimed to provide spring means which will insure even and regular movements of the valve plate, the springs for this purpose being readily secured in place, or removable therefrom, whenever necessary; a bearing of the springs upon the valve plate such that the latter will respond more sensitively to the pressure of the former; a reversible valve seat, also a reversible valve plate; and means adjustable in tension for maintaining each valve securely within its mounting.

Various objects and purposes such as the above are contemplated in the present invention, as are also others which will hereinafter appear. In the description to follow, reference will be made to the accompanying drawings which exhibit certain embodiments of my invention in the manner following:

Figure 1 is an axial section through the valve assembly taken on line 1—1 of Fig. 2;

Fig. 2 is a transverse section therethrough on line 2—2 of Fig. 1;

Fig. 3 is a perspective view of one of the springs per se;

Fig. 4 is a view similar to Fig. 2, showing a stop plate, also spring means, of slightly modified construction;

Fig. 5 is a plan view of the reversible valve disk which is used with the construction of Fig. 4;

Fig. 6 which is a view similar to Fig. 4 shows a modification in the construction of the stop plate and spring means associated therewith;

Fig. 7 is an enlarged detail in section of one form of bearing for a spring end on the valve plate; and Fig. 8 is a fragmentary view in elevation and partly in section of a compressor wall, wherein are mounted the present valves with the aid of an improved securing means therefor.

The valves of this invention are particularly suitable for use with blowers of the type which are commonly employed for the discharge of relatively large volumes of air at comparatively low pressure. Such blowers are generally operated at a relatively high speed, so that the check valves controlling the inlet and discharge ports for air are also reciprocated at comparatively high speed. Owing to conditions such as these, the valves are subjected to hard usage which results in their frequent wearing out, and necessitating their consequent renewal or repair. It is accordingly an object of this invention to provide for this kind of service a check valve which is inexpensive, efficient, and which may be easily and quickly repaired, or renewed whenever necessary, without shutting down operation of the compressor for any extended period.

Referring now particularly to Figs. 1 and 2, I have shown therein a discharge valve which is adapted for attachment directly to the compressor wall or to a cage which is carried thereby, the valve assembly including a seat member A with which is associated a stop plate B detachably connected to the seat as through the medium of a bolt C, the head of which may be countersunk in the stop plate, as shown. Interposed between these parts is a valve plate D in the form of a disk against which a constant pressure is exerted by spring means E, the disk being thereby held normally upon its seat. The parts just enumerated are the principal ones which enter into the construction of this valve, but they are specially formed to cooperate with each other in a peculiar manner, as will now be explained.

The seat member which lies inwardly of the stop plate is provided with a hub 15, a rim 16, and an intermediate circular wall 17 having annular grooves 18 in both its inner and outer ends, as shown. On the outer periphery of the rim are two circular surfaces 19 and 20 oppositely tapered so as to meet in a plane which is midway of the body length at which point the body is of greatest diameter. Due to this construction, as well as to its formation elsewhere, the seat member may be fitted upon a compressor wall with either of its ends proximate thereto, whereby the valve is reversible in its mounting thereupon.

Each end of the seat member, which is a counterpart of the other, is formed to provide a seat for the valve plate which is adapted to rest upon the annular edges 21 of the rim 16, also the annular edges 22 of the intermediate circular wall 17, as well as certain annular edges 28 which are formed on the hub 15. Connecting the hub with the circular wall are a plurality of spokes or webs 24, this wall being further connected to the rim as by means of other spokes or webs 25, the construction being such that between these several spokes are ports of ample size through which the air may pass when the valve plate is lifted from its seat.

The bolt C serves as a convenient means for attaching the stop plate to the seat member, and permits these parts to be readily disconnected whenever desired. I preferably interpose therebetween a spacing member in the form of a bushing 30 which is adapted to lie upon one hub end adjacent the inner side of the stop plate, as shown, this bushing extending through a central aperture in the valve plate so as to guide the latter in its reciprocating movements. The construction of the parts is such that the stop plate may be attached to either end of the seat member by simply reversing the positions of the bolt and spacing member. It is to be understood, of course, that with any such change in positions the valve plate, together with its spring means, would also be re-positioned.

On its inner side the stop plate is provided with a marginal flange 31 and with certain configurations in the form of walls or flanges which depend therefrom for substantially equal distances. I further provide through the stop plate certain ports 33, shown as two in number, each port being shown in the form of an arcuate slot on opposite sides of the plate center. Also other smaller ports 34 shown as four in number are grouped between the others, all of these ports being equidistant from the center of the plate. Surrounding these ports on their inner sides and elsewhere are bordering walls 35 which are so disposed as to provide four radial recesses 36 and other larger recesses 37 to the number of two, these latter recesses being extended closer toward the valve center than the others. A stop plate of the kind described will accordingly present on its inner side a pair of oppositely disposed arcuate shaped slots and adjacent each end of such slots other smaller ports which number four altogether, there being between each pair of such smaller ports a comparatively wide radial recess which lies diametrically opposite the other. The smaller recesses which are disposed between each port and the proximate end of the adjacent slot are grouped around the stop plate at distances of 90°, as appears clearly in Fig. 2. The walls which lie upon opposite sides of the two recesses 37 are equipped with flanges 41 facing each other, these flanges being spaced from the plate body so as to provide, in effect, a pair of oppositely facing channels. Also in each of these recesses there is arranged a member which may take the form of a boss 42.

With a stop plate so constructed, I associate two springs which bear upon the valve at four points 90° apart. These springs, which may conveniently be made of wire having the requisite tension, are best illustrated in Fig. 8, and comprise in each instance a pair of oppositely bowed arms 45 and 45' which are bent at 46 and 46' to provide parallel sections 47 and 47'. These parallel sections extend inwardly between the two bowed arms and terminate in a widened head portion 48 which may have therein a crimp 49 in the form of a partial eye. The free ends of the two bowed arms are bent around as at 50 and 50', and their extremities, which are pointed, are downturned, as at 51 and 51' so as to bear against the valve plate.

A pair of springs of the form described are adapted to be interposed between the valve plate and the stop plate, as well as to be detachably mounted on the latter. In assembling each spring in place, its head 48 is slid within one recess 37, the width of the head being such as to project its opposite ends into the channeled guideway formed by the flanges 41. In this manner each spring head is confined in place and may not disengage from the stop plate except by an outward sliding movement. In addition, however, the spring crimp 49 may be engaged with the boss 42, the crimp being formed with a partial enclosure having a constricted entrance, so as to require the application of considerable force when moving the spring into or out of embracing relation with the boss.

A construction answering to this description will provide for a detachable connection of the spring with the stop plate, the former being held in place by friction, supplemented, if desired, by its own spring action. When so assembled with the stop plate, the bowed arms on the spring will extend away from each other in opposite directions, one of these arms 45 following a circular path which is situated from the valve center a radial distance appreciably greater than the other denoted as 45'. This latter arm, i. e., the one which lies closer to the valve axis, is provided with an inwardly extending crimp 52 adapted to lie within the recess 36 which is proximate to the recess 37 wherein the spring head is confined. The free ends of the spring are lodged, respectively, in the two recesses 36 which are furthest removed from the recess 37 wherein the spring head is received, the spring extremities extending downwardly to bear with pressure against the valve plate. An exactly duplicate spring is also mounted on the stop plate, but in reverse relation to the other, its head being confined within the opposite recess 37. The bowed arm 45 of this second spring will, as shown in Fig. 2, lie to the outside of the bowed arm 45' of the other spring, and the bend 50 of this second spring will lie within the crimp 52 of the first spring. As to the other arm 45' of this second spring, it will be noted that this is disposed to the inside of the arm 45 of the first spring, the crimp 52 permitting the one spring to pass around the other without crossing or overlapping. It thus appears that in the spring constructions suggested, I have provided two heads which connect with the stop plate on opposite sides of its center, and four bearing points which engage the valve disk at points which are 90° apart, each spring being independent in its action of the other, and permitting the valve disk to move, but without turning, toward the stop plate.

At the points where the spring extremities engage with the valve disk, I provide a special form of bearing which is best shown in Fig. 7. This consists of a button 55 which is inserted within an opening 56 in the valve plate, the button having a pair of heads 57 and 58 which overlie opposite sides of the valve disk. The button may, if desired, be loosely mounted so as to have capacity for rotation, and is further formed with a pair of axial openings 59 and 60 each of which extends toward the other for an equal distance but not sufficiently far to meet. Into the opening at either button end may be received one of the pointed spring extremities 51 or 51' which rests upon the opening bottom with a minimum of friction. In this manner the bearing of the spring upon the valve disk is through the medium of the button which, as shown, is similarly formed on both sides so as to permit of reversal of the valve disk, if this be desired.

From the preceding description it will be observed that the valve in its entirety consists of only four main parts—the reversible seat member, the reversible valve plate, the stop plate with detachable spring assembly, and the connecting bolt which retains these elements in operative relation. As will later appear, the seat member may also be reversed in its mounting on the compressor, and because of these several characteristics the valve parts may be reassembled, as necessary, to insure long life and best service.

The present valve may be modified in various ways, certain alternative constructions being suggested elsewhere in the drawings. In Fig. 4, for instance, the stop plate is provided with open slots 33 forming ports through which the air may pass, and also on its under side with radial recesses 37, here shown as three in number. Extending into each of these recesses are facing flanges 41 providing a channeled guideway adapted to receive the head 60 of a spring which comprises two parallel portions 61 leading from the head and thence around as at 62 and 62' to provide oppositely extending curved arms 63 and 63' near the ends of which are bends 64 and 64' which terminate in downwardly depending extremities 65 and 65' adapted to bear against the valve disk at points removed from the spring head about 120°. Associated with such a spring are two others of generally similar formation, each having its head 60 received in one of the other recesses 37 and presenting its bearing extremities approximately 120° away. The six bearing points of these three springs are arranged equidistantly in groups of two so as to present an even pressure upon the valve disk. In order that the curved arms of these several springs may have a lapping relation to each other, I form these arms to lie in circular paths having different radial distances from the valve axis, as appears clearly in Fig. 4. In this construction, as in the one shown in Figs. 1–3, it will be noted that each spring head is confined in place within the channeled guideway provided in one of the recesses 37.

In Fig. 5 is shown a valve disk suitable for assembly with the construction of Fig. 4. It will be observed that between the bearing ends of the springs which are arranged in groups of two at three points, the distances vary in each instance, owing to the different paths traversed by the curved arms 63 and 63'. Due to this circumstance, I provide in the valve disk three groups of sockets or holes 70, four being the number of such sockets in each group. With this arrangement the bearing points of the several springs may lodge in appropriate holes spaced apart the required distance, thereby assuring non-rotation of the disk in all of its reciprocating movements. Such an arrangement of sockets or holes is also provided, by preference, on the opposite side of the valve plate, thereby adapting it for reversal, should this be desired.

In Fig. 6 is shown a construction of stop plate very similar to that set forth in Fig. 2. The springs, however, are slightly modified in that the bowed arms are devoid of crimps, from which it results that one spring is required to cross over the other. Such a construction may be preferred particularly if a sufficient clearance be left for free operation of the spring.

In each of the figures wherein the stop plate is exhibited, it will be noted that certain notches 80 are shown adjacent its periphery, these notches being formed by providing two lugs 81 which protrude outwardly a slight distance in spaced relation to each other. In mounting these valves upon the compressor, suitable openings are provided in its walls wherein the seat member is entered, its tapered periphery 19 or 20 being adapted to fit snugly therewithin. If desired the compressor may employ a cage 82 (see Fig. 8) adapted to receive a number of valves disposed circumferentially about the compressor, the valves so arranged being then locked tightly in place as by means of a wire or rod 83 which overlies them all. This rod is held in place between the lugs 81 forming the notches on two of its opposite sides, the rod ends 84 which are threaded being engaged by a turn-buckle 85 and tightened to thereby hold all of such valves firmly in their mountings. This means of attachment is advantageous in that it is simple and permits the securing of a number of valves with one rod, the tension of which may be adjusted with the turn-buckle. In addition, it facilitates the removal of any of the valves should this become necessary at any time.

I claim:

1. In a valve of the kind described the combination of a seat, a stop plate associated therewith, a disk interposed between the seat and stop plate, and a pair of springs slidably locked to the plate and formed to bear with pressure upon the disk at four equidistant points, substantially as described.

2. In a valve of the kind described, the combination of a seat, a disk adapted to rest thereupon, a stop plate connected with the seat, there being formed on the under side of the stop plate a plurality of recesses two of which, on diametrically opposite sides of the plate center, are formed with channeled guideways, a pair of springs interposed between the stop plate and the disk, each spring having a head adapted to be slidably received within one of the channeled guideways and formed also with a crimp extending into one of the other recesses, each spring being further formed with a pair of oppositely disposed bowed arms, arranged to extend in part past a corresponding arm of the other spring, the ends of each spring being turned to bear upon the valve disk at a point which is adjacent a radial recess in the stop plate, substantially as described.

3. In a valve of the kind described, the combination of a seat, a reversible disk adapted to rest thereupon, a stop plate connected with the seat, a spring interposed between the stop plate and the disk having a detachable connection with the former, and a bearing member mounted on the disk adapted to receive at either of its opposite ends the thrust of the spring, substantially as described.

4. A valve of the kind described adapted for fitting in a compressor wall, means on the outer valve side providing guides on opposite sides of the valve center, a tension device co-operating with said guides and extending over said outer valve side for connection with the compressor, and means for varying the pressure of the tension device whereby the valve is securely held in its mounting, substantially as described.

5. In a valve of the kind described, the combination of a seat, a stop plate removably connected thereto, a disk reciprocably mounted between the seat and stop plate, a plurality of springs carried by the stop plate, each adapted to present its opposite ends upon the disk to urge the same toward the seat, and means on the disk wherein the spring ends are centered, substantially as described.

CHARLES H. LEINERT.